United States Patent Office 3,211,712
Patented Oct. 12, 1965

3,211,712
PRODUCTION OF POLYVINYL ACETATE AND POLYVINYL ALCOHOL
Masakazu Matsumoto and Kiyokazu Imai, Kurashiki, and Unpei Maeda, Sozya, Japan, assignors to Kurashiki Rayon Co., Ltd., Kurashiki-shi, Okayama Prefecture, Japan, a corporation of Japan
No Drawing. Filed Jan. 31, 1963, Ser. No. 255,216
Claims priority, application Japan, Mar. 20, 1959, 34/8,628
5 Claims. (Cl. 260—89.1)

This invention relates to the production of polyvinyl acetate and polyvinyl alcohol and is more particularly concerned with an improved process for polymerizing vinyl acetate. This invention also includes a process for producing polyvinyl alcohol having a more regular or systematic structure, and polyvinyl alcohol having a high degree of crystallizability and a low degree of swelling and improved gelling characteristics.

Polyvinyl acetate resins and polyvinyl alcohol resins are well-known polymeric materials. Many processes and procedures are disclosed in the art for producing these resins. Many polymerization systems are known for the free radical initiated polymerization of vinyl acetate to produce polyvinyl acetate. Polyvinyl alcohol resins are used in many commercial products and commercial applications as films, adhesives, fibers, and coating applications. Polyvinyl alcohol is suitably produced by the conversion or hydrolysis of polyvinyl acetate. This conversion may be hydrolysis, alcoholysis, or saponification. For example, alcoholysis or methanolysis of the polyvinyl acetate in methanol with an alkaline catalyst, as an alkali metal alkoxide or hydroxide, as sodium hydroxide. Such conversion procedures are conventionally referred to in the art as "saponification." This term "saponification" is used herein in the generic sense to signify the conversion of polyvinyl acetate to polyvinyl alcohol.

The preparation of polyvinyl acetate and polyvinyl alcohol presents many problems. It is well known that properties of polyvinyl acetate are subject to many variations depending on the polymerization system used. Further it is known that the characteristics of polyvinyl acetate are important with regard to their effect on the properties of polyvinyl alcohol produced from the polyvinyl acetate. It is, therefore, a problem when one desires to produce polyvinyl alcohol having certain desired properties. This problem is not readily solved since one has difficulty in determining the polyvinyl alcohol properties based on the properties of the polyvinyl acetate from which it is produced. This has resulted in many procedures being proposed to produce various types of polyvinyl acetate in order to obtain desired types of polyvinyl alcohol.

For many applications polyvinyl alcohol is used in a water solution or is handled in the particular process as a water-polyvinyl alcohol mixture. For example, films are prepared from water solutions of polyvinyl alcohol. It is highly desirable that such solutions have the proper viscosity characteristics and proper gelling characteristics. The degree of swelling, in water, of the polyvinyl alcohol film is also important. The viscosity and stability of a highly concentrated water solution of polyvinyl alcohol and the degree of swelling in water of the film will vary with the conditions of polymerization used to produce the precursor polyvinyl acetate. The viscosity-stability and degree of swelling will be changed with changes in the polymerization temperature. It appears that the viscosity-stability, and swelling characteristics are closely related to the molecular structure of the polyvinyl alcohol. Problems are encountered in producing polyvinyl alcohol films if viscosity characteristics are not satisfactory or the gel time is excessive. In summary, prior art procedures do not provide practical and economical procedures for producing polyvinyl alcohol having a high degree or high grade of crystallizability. The more regular or systematic the molecular structure of the polyvinyl alcohol, the more satisfactory is its viscosity properties, and the more easily does it gel, with a concurrent lower degree of swelling. Accordingly, it may be said that such a polyvinyl alcohol has a higher crystallizability.

It is, therefore, an object of this invention to provide a practical and economical process for producing polyvinyl alcohol having a high degree of crystallizability.

It is another object to provide an improved process for preparing polyvinyl alcohol which in water solution will easily gel and which will yield polyvinyl alcohol films having a low degree of swelling.

A further object is to provide an improved method of polymerizing vinyl acetate to yield a polyvinyl acetate that may be converted to polyvinyl alcohol having a high degree of crystallizability.

These and other objects, as well as other advantages of this invention, will become apparent or will be clarified or detailed specifically in the following description and examples.

This invention broadly involves the solution polymerization of vinyl acetate monomer where the solvent system comprises methanol and water and where the solvent system contains at least about 7.7 percent water. The solution polymerization medium or solvent system is referred to in this specification as "aqueous methanol," "hydrous methanol," or "water-methanol mixtures."

Extensive studies were done on the production of polyvinyl acetate using various solvents as the polymerization medium. It has been discovered that the polyvinyl acetate produced by solution polymerization of vinyl acetate using certain water-methanol mixtures has exeremely significant properties and characteristics. One major characteristic is that this polyvinyl acetate when saponified or converted to polyvinyl alcohol, yields a polyvinyl alcohol having desirable and advantageous properties with regard to its crystallizability. This polyvinyl alcohol allows production of polyvinyl alcohol films having a low degree of swelling in water. Further this polyvinyl alcohol is useful in producing polyvinyl alcohol-water solutions with desirable and satisfactory properties with regard to solution viscosity, solution stability, and gelling properties; these solutions are extremely unstable and gel readily or gel easily. In addition to the molecular structure of this polyvinyl alcohol is more regular and systematic; this was determined by the results of the iodine reaction of water solutions of the polyvinyl alcohol.

Polymerization of vinyl acetate in methanol has been reported, as, Okarmura, Urakawa: The Kogyo Kagaku Zasshi (The Journal of the Chemical Society of Japan, Industrial Chemical Section), 53, 303–305 (1950); and United States Patent No. 2,610,360, Cline E. T. (1952). These prior art procedures are not the same as the present invention and these disclosed procedures do not indicate how to obtain the benefits and advantages of the present invention.

In accordance with the present invention polyvinyl acetate is produced by the solution polymerization of vinyl acetate monomer in the presence of a polymerization catalyst about 7.7 percent by weight of water, as the polymerization medium or solvent system. The polyvinyl acetate obtained is saponified to obtain the desired and advantageous polyvinyl alcohol of this invention. The solution polymerization is conducted at a temperature below 64° C., and as low as −30° C.; a preferred temperature range is from about −10° C. to about 60° C. Generally the properties of the polyvinyl alcohol subsequently produced improve as the polymerization temperature is lowered. The crystallizability of the polyvinyl alcohol will be better, the lower the temperature of polymerization of vinyl acetate.

As indicated, the polymerization medium used in the solution polymerization of vinyl acetate is hydrous methanol; the amount of water should be in the range from about 7.7 percent to about 50 percent by weight, based on the total weight of the solvent system. It is preferred that the amount of water be in the range from about 11.5 percent to about 27 percent by weight, based on the total weight of the polymerization medium.

The solution polymerization of vinyl acetate may be conducted over a wide range of percent conversion of monomer to polyvinyl acetate; polymerizations where the conversions ranged from about 20 percent to about 100 percent have been found satisfactory. Operating at low conversions will increase the problem of unreacted monomer recovery. Generally conducting the polymerization to at least about 30 percent conversion is preferred.

The following examples are illustrative of the inventive features and procedures of this invention, and are not intended to limit the area of the invention. In these examples, all parts are by weight.

EXAMPLE 1

Vinyl acetate (50 parts), 40% hydrous methanol (50 parts) and azoisobutylonitrile (0.005 part) were subjected to polymerization in a sealed glass tube at 60° C. for 15.2 hours. There was obtained polyvinyl acetate having a degree of polymerization of 1695 in a yield of 76.4%. This polyvinyl acetate was dissolved in methanol, and was hydrolyzed to polyvinyl alcohol by means of an alkali catalyst in accordance with known saponification techniques. The polyvinyl alcohol thus produced had a degree of polymerization of 1405. A 12% water solution of this polyvinyl alcohol was allowed to stand at 30° C. and observation was made in terms of the constant $\alpha$ (hr.$^{-1}$). In this case, $\alpha$ is the value as determined by $\eta_t = \eta_0(1+\alpha t)$. $\eta_t$ represents the viscosity as after it has been left to stand for $t$ hour, and $\eta_0$, the viscosity as at 0 hour. The greater the value of $\alpha$, the more unstable the viscosity. In the following Table 1 are tabulated the results obtained with the product of the foregoing example together with the results corresponding to other polyvinyl alcohol produced from polyvinyl acetate formed in the presence of various other solvents in the quantities indicated. Polymerization in all cases was carried out at 60° C. and all determinations were made with 12% aqueous solutions of the polyvinyl alcohol.

Table 1

| Polymerization Medium | | Degree of Polymerization of Polyvinyl Alcohol | $\alpha \times 10^3$ (hr.$^{-1}$) |
|---|---|---|---|
| Type | Quantity (percent) | | |
| 40% hydrous methanol | 50 | 1,405 | 10.00 |
| Anhydrous methanol | 20 | 1,670 | 5.11 |
| Acetone | 15 | 1,965 | 1.67 |
| Acetic anhydride | 45 | 1,465 | 0.76 |

As will be seen in Table 1, the $\alpha$ value of the polyvinyl alcohol obtained from polyvinyl acetate polymerized in 40% hydrous methanol is substantially greater than the $\alpha$ values of the other polyvinyl alcohols.

EXAMPLE 2

Three batches of vinyl acetate in hydrous methanol of different water content and in different monomer/solvent ratios were prepared, viz. vinyl acetate (70 parts) and 30% hydrous methanol (30 parts); vinyl acetate (50 parts) and 40% hydrous methanol (50 parts); vinyl acetate (20 parts) and 50% hydrous methanol hydrate (80 parts). Each of these batches was polymerized with azoisobutylonitrile in a sealed tube at 60° C. under the conditions shown in Table 2 below. The polyvinyl acetate produced in each case was converted into polyvinyl alcohol in the manner referred to in Example 1. A film having a thickness of about 0.2 mm. was prepared at about 20° C. from each polyvinyl alcohol and the degree of swelling in water was determined at 30° C. by the weight method. A comparison of the degree of swelling of these films with like films formed from polyvinyl alcohols produced from polyvinyl acetate polymerized in other solvents and polymerized in bulk in the absence of any solvent is shown in Table 2.

Table 2.—Swelling degree of polyvinyl alcohol film in water

| Condition of Polymerization | | | | | Degree of Polymerization of polyvinyl acetate | Degree of Polymerization of polyvinyl alcohol | Degree of Swelling |
|---|---|---|---|---|---|---|---|
| Polymerization Medium | | Azoisobutylonitrile (percent) | Polymerization time (hr.) | Conversion (percent) | | | |
| Type | Quantity (percent) | | | | | | |
| 50% hydrous methanol | 80 | 0.01 | 6.2 | 59.5 | 1,020 | 1,020 | 1.82 |
| 40% hydrous methanol | 50 | 0.005 | 24.0 | 67.9 | 1,520 | 1,390 | 1.87 |
| 30% hydrous methanol | 30 | 0.005 | 8.0 | 48.4 | 2,610 | 2,080 | 1.9 |
| Anhydrous methanol | 30 | 0.02 | 4.0 | 40.5 | 1,470 | 1,440 | 2.15 |
| Ethyl acetate | 30 | 0.005 | 7.5 | 31.1 | | 2,295 | 2.64 |
| Bulk phase | | 0.005 | 4.0 | 28 | 9,760 | 4,480 | 2.57 |

As will be seen in Table 2, the degree of swelling of a polyvinyl alcohol obtained by polymerization by use of a solution of hydrous methanol in accordance with this invention is substantially lower as compared with that of a polyvinyl alcohol obtained by polymerization in bulk or by the use of other solvents.

EXAMPLE 3

To a water solution of ceric ammonium nitrate (dihydrate), was added methanol, and after cooling down to −20° C., vinyl acetate was added. Then the interior of the polymerization container was filled with nitrogen to replace any vapors and gas in it.

The quantities of the respective components of the polymerization mixture were as follows: ceric ammonium nitrate (dihydrate) (0.114 part), water (17.0 parts), methanol (40.5 parts), and vinyl acetate (42.5 parts). Keeping the above reaction system at 30° C., the mixture was subjected to reaction for 20 hours in the absence of light. A similar system was polymerized at 30° C. in the presence of light. Polyvinyl acetate with a polymerization conversion of 32% was obtained. This was saponified to yield polyvinyl alcohol having a degree of polymerization of 2080. Films produced from this polyvinyl alcohol were heat-treated under the same standard testing conditions as a film obtained from ordinary polyvinyl alcohol, and the degree of dissolution in water was determined. It was found that the temperature of dissolution of the former films was higher than that of the latter film by 5–6° C.

EXAMPLE 4

Thirty parts of vinyl acetate, 150 parts of water, and 0.15 part of ammonium persulfate were polymerized in emulsion at the temperature of 60° C. for three hours. Polyvinyl acetate thus obtained was saponified by a conventional method. When the degree of swelling in water of a film produced from this polyvinyl alcohol was measured, it showed the value of 3.0.

A film of polyvinyl alcohol was prepared from polyvinyl acetate produced by emulsion polymerization under the same conditions, except that water containing 10% methanol was used as the solvent instead of 100% water as in the previous run. The swelling degree of this film was 2.9. This value is higher than 2.6, the swelling degree of a film produced by bulk polymerization.

EXAMPLE 5

Solution polymerization of vinyl acetate according to the invention were run and where the polymerization medium was methanol or hydrous methanol. The polymerization temperature was 0° C. The polyvinyl acetate was saponified to polyvinyl alcohol. The results of a series of representative runs are tabulated in Table 3.

structure of the polyvinyl acetate results in the polyvinyl alcohol having a high degree of crystallinity. This solvent action of water and methanol apparently does not occur when emulsion polymerization techniques are used.

It will be understood that, unless otherwise indicated, conventional polymerization techniques used in the polymerization of vinyl esters are employed in carrying out the polymerization process of the present invention. Thus, the quantity of catalyst and the monomer/solvent ratios are varied to obtain variations in the degree of polymerization and in the percentage polymerization and conventional polymerization equipment suited to the conditions of polymerization is employed. The conditions and the relative relationships set forth in the examples are those preferred in carrying out the process of the invention but it will be understood that other conditions and relationships may be used within the scope of the invention.

It will be understood that various changes and modi-

*Table 3*

| Polymerization Medium | | Polymerization time (hr.) | Conversion (percent) | Degree of polymerization of PVA | Degree of swelling of PVA film | $D_{620}$ |
|---|---|---|---|---|---|---|
| Type | Quantity | | | | | |
| Anhydrous methanol | 60 | 6 | 38 | 1,580 | 1.50 | 0.98 |
| 7.7% hydrous methanol | 65 | 6 | 43 | 1,570 | 1.40 | 1.35 |
| 14.3% hydrous methanol | 70 | 6 | 51 | 1,540 | 1.35 | 1.65 |
| 20.0% hydrous methanol | 75 | 6 | 52 | 1,460 | 1.30 | 1.95 |
| 25.0% hydrous methanol | 80 | 6 | 55 | 1,340 | 1.29 | 2.16 |
| 29.4% hydrous methanol | 85 | 6 | 56 | 1,150 | 1.26 | 2.15 |
| 33.4% hydrous methanol | 90 | 6 | 26 | 1,170 |  | 2.20 |

NOTE.—$D_{620}$ is the optical density at the maximum absorption 620 m$\mu$ of the iodine-coloration-solution of PVA aqueous solution. This value is affected by the polymerization degree, and the larger the polymerization degree, the larger the value is, but when the polymerization degree is the same, the larger the crystallinity is, the larger the value becomes. Therefore, in the table above, although the polymerization degree is lowered with the use of hydrous methanol containing larger amounts of water, $D_{620}$, on the contrary, becomes greater. This means that the larger the amount of water in the hydrous methanol is, the better the crystallinity becomes.

EXAMPLE 6

With the procedures similar to the previous example vinyl acetate was polymerized at 0° C. Various polymerization mediums were used. The polyvinyl acetate produced in each case was converted into polyvinyl alcohol in the manner referred to in Example 1. The results of a series of runs are tabulated in Table 4.

fications may be made without departing from the scope of the invention as defined in the appended claims and it is intended, therefore, that all matter contained in the foregoing description shall be interpreted as illustrative only and not as limitative of the invention. This application is a continuation-in-part application of Serial No. 15,801, filed on March 18, 1960, now abandoned.

*Table 4*

| Polymerization medium | | Polymer Conversion (percent) | Degree of Polymerization of PVA | Aqueous Solution of PVA | | |
|---|---|---|---|---|---|---|
| Type | Quantity (percent) | | | Concentration (percent) | Initial Viscosity $\eta_0$ (Poise)a | $\eta_{25}/\eta_0$b |
| Anhydrous methanol | 38 | 36 | 2,240 | 12.1 | 34.3 | 1.1 |
| 11.5% hydrous methanol | 43.5 | 38 | 2,200 | 12.6 | 38.4 | 1.4 |
| 20.4% hydrous methanol | 49 | 40 | 2,310 | 12.2 | 36.6 | 1.9 |
| 27% hydrous methanol | 50 | 42 | 2,190 | 12.7 | 45.0 | 2.3 | a At 40° C. and zero time.
b $\eta_{25}$ is the viscosity after standing at 40° C. for 25 hours.
NOTE.—The data in Table 4 show a comparison of the viscosity of aqueous solutions of PVA after letting the solution stand for 25 hours.
As can be seen from the above ratio, $\eta_{25}/\eta_0$, the tendency to gelation becomes greater and so does the crystallinity of the polyvinyl alcohol with an increase in the amount of water in the polymerization medium.

While not being bound by any explanation or theory of the reasons for the benefits and advantages of this invention, it appears that the presence of water and methanol results in the formation of a hydrogen-type bond on the side chain structure of the vinyl acetate monomer. Further this is a bulky side chain on the monomer. During polymerization the monomer is oriented or yields a polyvinyl acetate with a more regular or systematic structure because of the steric hindrance action of the side chain structure. When more water is present, this steric hindrance effect is further stimulated. With anhydrous methanol or using a bulk polymerization system, this steric hindrance action does not occur or occurs to a much lesser degree. It is believed that the molecular

We claim:

1. A process of producing polyvinyl acetate by solution polymerization which comprises polymerizing vinyl acetate monomer in a solution polymerization system comprising vinyl acetate monomer and a free radical polymerization catalyst and a solution polymerization medium and at a polymerization temperature below 64° C., and where said solution polymerization medium comprises hydrous methanol containing from about 7.7 percent to about 50 percent by weight of water.

2. A process according to claim 1, wherein said hydrous methanol contains from about 11.5 percent to about 27 percent by weight of water and where said polymerization temperature is from about −10° C. to about 60° C.

3. A process according to claim 2, wherein at least 30 percent of said vinyl acetate monomer is converted to polyvinyl acetate.

4. A process of preparing polyvinyl alcohol which comprises solution polymerizing vinyl acetate monomer in the presence of a free radical polymerization catalyst and in a solution polymerization medium comprising hydrous methanol containing from about 7.7 percent to 50 percent by weight of water and at a polymerization temperature below 64° C., recovering polyvinyl acetate from the polymerization system, and saponifying said polyvinyl acetate to obtain polyvinyl alcohol having a high degree of crystallizability and improved gelling properties.

5. A process according to claim 4, wherein said hydrous methanol contains from about 11.5 percent to about 27 percent by weight of water and where said polymerization temperature is from about −10° C. to about 60° C.

References Cited by the Examiner

UNITED STATES PATENTS

| | | | |
|---|---|---|---|
| 2,581,844 | 1/52 | Eggleston | 260—89.1 |
| 2,609,366 | 9/52 | Fryling et al. | 260—89.1 |
| 2,759,914 | 8/56 | Kenyon et al. | 260—89.1 |
| 2,782,173 | 2/57 | Bristol et al. | 260—89.1 |

JOSEPH L. SCHOFER, *Primary Examiner.*